Figure 1:
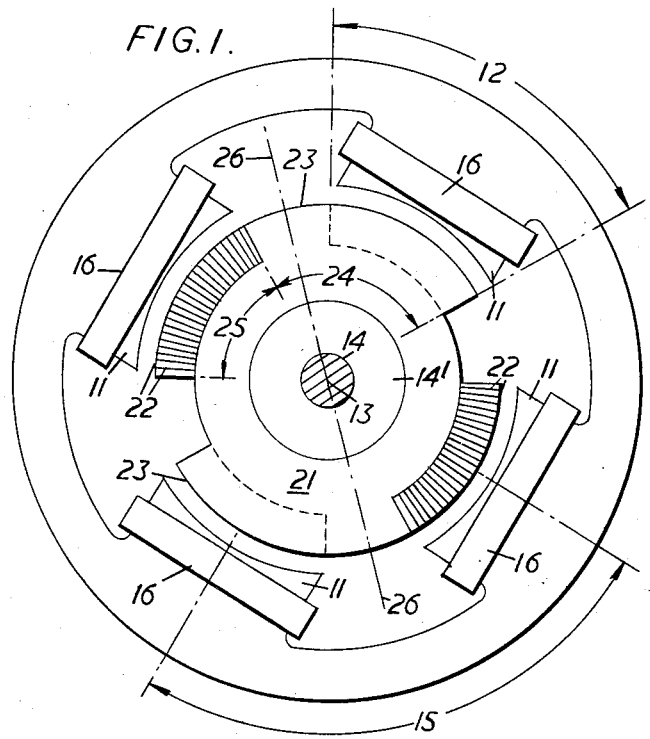

March 6, 1962   K. R. BROWN ET AL   3,024,409
ELECTROMAGNETIC PICK-OFF DEVICES

Filed Jan. 31, 1958   2 Sheets-Sheet 1

Inventors
Kenneth Robson Brown
Cyril Gray
By
Cameron, Kerkam & Sutton
Attorneys

March 6, 1962   K. R. BROWN ET AL   3,024,409
ELECTROMAGNETIC PICK-OFF DEVICES
Filed Jan. 31, 1958   2 Sheets-Sheet 2
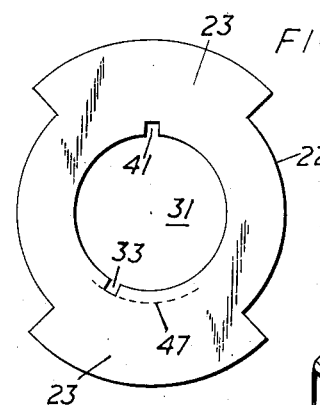
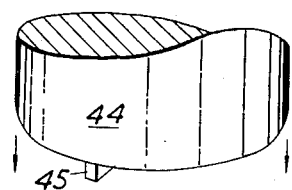
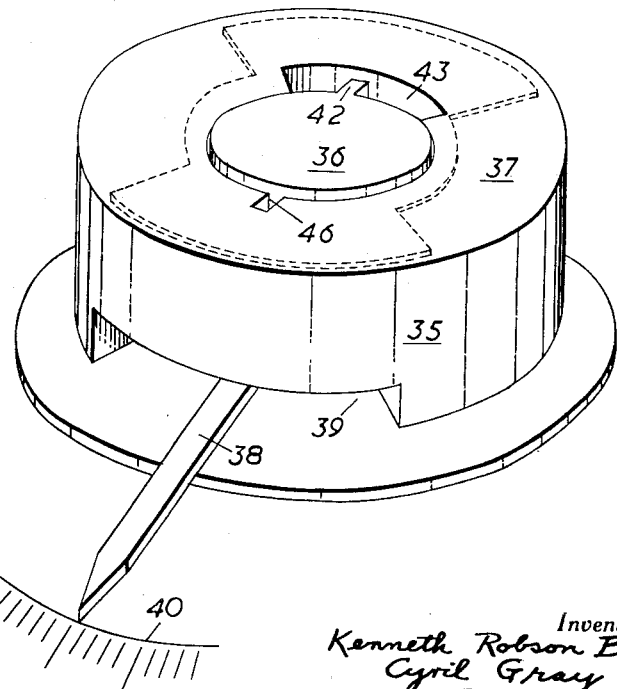
Inventors
Kenneth Robson Brown
Cyril Gray
By
Cameron, Kerkam & Sutton
Attorneys

United States Patent Office 3,024,409
Patented Mar. 6, 1962

3,024,409
ELECTROMAGNETIC PICK-OFF DEVICES
Kenneth Robson Brown and Cyril Gray, Edinburgh, Scotland, assignors to Ferranti, Limited, Hollinwood, England, a company of the United Kingdom of Great Britain and Northern Ireland
Filed Jan. 31, 1958, Ser. No. 712,455
Claims priority, application Great Britain Feb. 2, 1957
2 Claims. (Cl. 323—75)

This invention relates to electromagnetic pick-off devices of the type for providing an alternating-current (A.C.) output voltage which represents by its amplitude and phase the magnitude and direction of the angular position of a shaft with respect to a datum position.

A known arrangement of this type of pick-off device, for example, includes a four-pole stator, each pole carrying a winding, and an unwound laminated bipolar rotor formed by a stack of like salient-pole stampings. The four windings are connected to form an inductive bridge energised by an A.C. voltage applied across one diagonal. The output voltage is that developed across the other diagonal. The amplitude and phase of this output voltage with respect to the energising voltage depend on the relative magnetic reluctance of the airgaps in the arms of the bridge and this in turn depends on the angular position of the rotor poles with respect to the stator poles. Clearly there are four angular positions of the rotor for which the bridge is in balance, the output voltage being then approximately zero. At intermediate angular positions of the rotor the output voltage amplitude follows an approximately trapezoidal cyclic waveform when plotted against the angular positions of the rotor. As the slopes are approximately linear for about 30 degrees on each side of the null points such a pick-off is mainly used where a linear response is required.

An object of the invention is to provide a pick-off device of the type stated in which the output voltage is a required function, other than a linear function, of said angular position of the rotor.

A particular object is to provide such a device where the required function approximates to a sinusoid.

In accordance with the present invention, an electromagnetic pick-off device for providing an A.C. output voltage which represents by its amplitude and phase the magnitude and direction of the angular position of a shaft with respect to a datum position includes a stator component having a plurality of wound poles, means for energising the pole windings by an alternating voltage, an unwound salient pole rotor component secured to said shaft, at least one of said components being formed by a stack of stampings in planes normal to the rotor axis, said stampings being alike one another as regards their pole-forming portions and being angularly displaced with respect to one another in the same direction part way round the rotor axis, and connections for deriving said output voltage in dependence on the difference between the voltages set up in operation across the respective stator windings, the extent of angular displacement of each stamping with respect to the other stampings being such that on rotation of said shaft the said output voltage is, in respect of amplitude and phase with reference to said alternating voltage, the required function of the angular position of the shaft.

Also in accordance with the invention, an electromagnetic pick-off device for providing an A.C. output voltage which represents by its amplitude and phase the magnitude and direction of the angular position of a shaft with respect to a datum position includes a stator having four wound poles uniformly spaced round the axis of said shaft, means for energising the pole windings by an alternating voltage, an unwound rotor having two salient poles secured to said shaft, said rotor being formed by a stack of stampings in planes normal to the rotor axis, the stampings being angularly displaced substantially uniformly with respect to one another in the same direction round the rotor axis over an angular span of displacement substantially equal to the angular span of each wound stator pole, and connections for deriving said output voltage in dependence on the difference between the voltages set up in operation across the respective stator windings.

By the expression "angular span" used with reference to the stator and rotor poles is meant the angle subtended by the pole at the rotor axis in planes normal to that axis.

By "angular span of displacement" of the stampings is meant the overall angular displacement of the outermost stampings with respect to one another.

Figure 2:
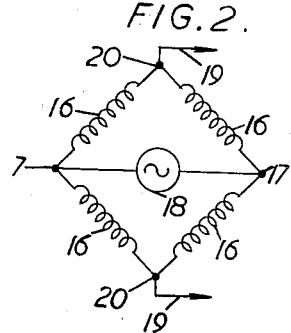
Figure 3:
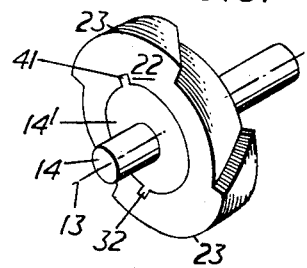

In the accompanying drawings,

FIGURE 1 is a view in elevation of one embodiment of the invention, with bearings and framework omitted for clarity, FIGURE 2 is a diagram of connections for the embodiment of FIGURE 1, FIGURE 3 is a view in perspective of a part of the embodiment of FIGURE 1, FIGURE 4 is a plan view of a further part of the embodiment of FIGURE 1, and FIGURE 5 is a view in perspective to illustrate a method of making the part shown in FIGURE 4.

In carrying out the invention in accordance with one form by way of example, a single-phase pick-off to provide a sinusoidal output consists of a stator having four wound poles 11—see FIG. 1—each of which has an angular pole span 12 of 60 degrees at the axis 13 of the rotor shaft 14. The poles are uniformly spaced round axis 13 and hence their angular spacing 15—by which is meant the angle subtended by adjacent pole centres at axis 13 in a plane normal to the axis—is 90 degrees.

The windings 16 are connected in series as an inductive bridge network—see FIG. 2—as described above with reference to known arrangements. To one pair 17 of opposite points of the network is applied an A.C. voltage from some source 18, and the output voltage having the desired sinusoidal relationship with the angular position of the shaft is derived over connections 19 from the other pair of opposite points 20.

The rotor 21, which is unwound, is built up of a stack of bipolar stampings 22 which are alike as regards their pole-forming portions 23. Each of such pole portions has an angular span 24 of 90 degrees, which is thus equal to the angular spacing 15 of the stator poles. If these stampings were to be assembled in register with one another, as in known devices of the type stated, the output of the pick-off would possess the approximately trapezoidal waveform above referred to. In accordance with the invention, however, the stampings are displaced uniformly with respect to one another in the same direction round the rotor axis to such an extent that the overall angular displacement 25 of the outermost stampings with respect to one another is about 60 degrees, which is approximately equal to the angular span 12 of the stator poles. Each stamping is thus displaced from the next by a constant angle; where for example there are 61 stampings this angle is one degree. As a result of this construction the salient poles of the rotor are skew with respect to the rotor axis, as shown also in FIG. 3. As the rotor revolves, therefore, the area of registration of its skew poles with the straight poles of the stator and hence the magnetic reluctance of the respective airgaps vary in such a non-linear manner on rotation of the rotor as to cause the output voltage amplitude to vary approximately sinusoidally with the angular position of the rotor shaft with respect to a datum position in a phase relationship with reference to the energising voltage dependent on the direction of rotation from the datum position. Such a datum position is that in which a plane of symmetry of the rotor, indicated in FIG. 1 by the broken line 26, lies midway between the centres of adjacent stator poles, with the result that the reluctances of all the airgaps are equal.

By making the displacement of the rotor stampings suitably non-uniform, to an extent which is nevertheless slight enough for the displacements to be still substantially uniform, a closer approximation to an exact sinusoid may be achieved.

A convenient method of manufacturing the rotor of the above-described embodiment is as follows. Each stamping 22 is provided with a circular aperture 31 (see FIG. 4) which is a close fit on an enlarged part $14^1$ (FIGS. 1 and 3) of the rotor shaft 14. Extending radially from the surface of this part of the shaft is a straight rib or key 32 (FIG. 3) running parallel to the shaft axis 13 to engage a keyway 33 (FIG. 4) which extends radially from the shaft aperture 31 of each stamping. In order to ensure that in the finished stack the stampings are angularly displaced with respect to one another in the required manner despite being keyed to shaft $14^1$ by this straight key 32, each keyway 33 is angularly positioned with respect to the pole portion 23 of the stamping in an appropriately different position.

A convenient method of forming these keyways is to use a punch-press jig comprising a fixed annular die 35 (FIG. 5) with its plane surfaces horizontal. The inner diameter is the same as that of the apertures 31 of the stampings. Rotatably within the die is a cylindrical mandrel 36 having a diameter equal to that of the enlarged part $14^1$ of the rotor shaft. The mandrel extends above the upper plane surface 37 of the die by an amount a little greater than the thickness of a stamping. From the lower end of the mandrel a control lever in the form of a pointer 38 extends radially through an arcuate slot 39 in the die to a scale 40 by which the angular position of mandrel 36 with respect to the die can be accurately indicated over the angular range—60 degrees, in the arrangement of FIG. 1—of relative displacement of the stampings.

To locate each stamping 22 angularly with respect to mandrel 36 each stamping is provided with an auxiliary keyway 41 shaped to engage a rib 42 extending from the cylindrical surface of the mandrel. To accommodate this rib and allow rotation of the mandrel relative to the die through the angular range above mentioned, the radius of the inner cylindrical surface of the die is increased sufficiently at 43 to clear rib 42 over the arcuate range of its travel. The auxiliary keyway 41 is located in each stamping in the same angular position with respect to the pole portion 23 of the stamping, with the result that the angular position of this portion of each stamping with respect to the pointer is always the same. These auxiliary keyways should not be confused with the keyways 33, which will hereinafter be referred to as the main keyways.

In co-operation with the die is the punch itself, 44. This is provided with a radial cutting tool 45 having the shape of the main keyways 33. To receive this tool the upper plane surface 37 of die 35 is provided at the point of application of the punch tool with a cavity 46 in register with tool 45 and extending radially into the die from its inner cylindrical surface. This cavity is located approximately diametrically opposite to the mean position of the mandrel rib 42 to ensure that in each stamping the auxiliary and main keyways are well separate. It is of course desirable to locate each keyway where it least diminishes the area of metal for carrying the magnetic flux; they are therefore best located within the angular span of the pole portion 23 of the rotor.

In use, each stamping is fitted over mandrel 36 so as to rest on die 35, the auxiliary keyway 41 being engaged by the mandrel rib 42. Pointer 38 is adjusted to rotate the mandrel sufficiently to bring the required position on the stamping of the main keyway 33 into register with the punch cavity 46 in the die. The punch is then operated to form this keyway.

The position of the pointer is adjusted anew for each stamping to ensure that the angular positions of the main keyways with respect to the pole portions vary from stamping to stamping according to the required function of the angular position of the shaft with respect to the datum position above referred to. To allow the main keyways to have the maximum range of position on each side of the datum position whilst remaining within the pole portion concerned, as indicated in FIG. 4 by the broken line 47, the auxiliary keyways should themselves be located in the centre of a pole span, as depicted in FIG. 4.

The stampings so produced are assembled in the correct order on the rotor shaft $14^1$ so that the straight key 32 on the shaft engages the main keyways 33. The stampings are then secured together axially in any convenient manner. The required stack of displaced stampings is thus produced.

To prevent confusion between the main and auxiliary keyways at this stage, the shape or thickness or radial depth of the auxiliary keyways may be made sufficiently different from the corresponding shape or dimension of the main keyways.

If the punch-press is to be used by unskilled operators the scale may be replaced by an indexing mechanism such as arcuate bar with notches at selected points for engaging the pointer of the mandrel and locating it accurately.

Various details of the above arrangements, such for example as the interconnections of the stator windings (which need not necessarily be connected together in series to form a closed circuit) and the angles of the pole spans and of the rotor stamping displacement, may be modified within the scope of the invention.

In any of the above embodiments, by means of other appropriate non-uniform displacements of the stampings, the output voltage may be made to be other single-valued functions of the rotor shaft displacement. The angular displacements of the respective stampings for such another function may be arrived at by assuming that each stamping, acting alone, produces a trapezoidal waveform, and that a stack of displaced stampings produces a resultant waveform which is the sum of the individual trapezoidal waveforms. The resultant waveform may thus be calculated numerically or derived graphically, the displacement angles of the respective individual waveforms and hence of the corresponding stampings being adjusted until the resultant waveform fits the curve representing the desired function.

The component having the skewed stampings may be the stator rather than the rotor, the rotor being formed of stampings assembled in register with one another in the usual way. In this embodiment it is convenient to wind the stator coils on a specially-shaped mandrel to ensure that they fit neatly on the stator poles. The principle of operation is the same as before; the area of registration of the skew poles of the stator with the straight poles of the rotor, and hence the airgap relutances, vary in the required non-linear manner with the angular position of the rotor shaft.

As the angular movement of the rotor affects the amplitude of the output voltage, a device in accordance with the invention may be used as a mechanical means of effecting amplitudes modulation, the modulating signal being such as to vary the angular position of the rotor with respect to the datum position.

A device in accordance with the invention also has important applications as a function-generator in an analogue computer. In such an application the rotor may for example be displaced manually, or by servo action in response to data provided elsewhere in the computer, to provide a voltage which is the desired function of the displacement.

What we claim is:

1. An electromagnetic pick-off device for providing an A.C. output voltage which represents by its amplitude and phase the magnitude and direction of the angular position of a shaft with respect to a datum position, comprising:

a rotatable shaft;
a stator having four poles each having an angular span of 60° uniformly spaced round the axis of said shaft;
a winding on each of said stator poles;
means for energising said stator pole windings by an alternating voltage;
an unwound rotor secured to said shaft having two salient poles and forming a flux bridge between adjacent stator poles, said rotor being formed by a stack of annular stampings fixed to said shaft and lying in planes normal to the axis thereof,
each of said stampings having two diametrically opposite pole-forming portions each having an angular span of 90,
said stampings being of identical shape as regards their pole-forming portions but being angularly displaced substantially uniformly with respect to one another in the same direction round the axis of said shaft over an angular span of 60°, whereby both salient poles of said rotor formed by the pole-forming portions of said stampings are skew with respect to the axis of said shaft; and
connections to said stator pole windings for deriving said output voltage in dependence on the difference between the two voltages set up in operation across the respective stator pole windings.

2. An electromagnetic pick-off device for providing an A.C. output voltage which represents by its amplitude and phase the magnitude and direction of the angular position of a shaft with respect to a datum position, comprising:

a rotatable shaft;
a stator having four poles of equal angular span uniformly spaced round the axis of said shaft;
a winding on each of said stator poles;
means for energising said stator pole windings by an alternating voltage;
an unwound rotor secured to said shaft having two salient poles and forming a flux bridge between adjacent stator poles, said rotor being formed by a stack of annular stampings having key and keyway connections to said shaft and lying in planes normal to the axis of said shaft,
each of said stampings having two diametrically opposite pole-forming portions of equal angular span,
said stampings being of identical shape as regards their pole-forming portions but having their points of connection to said shaft so positioned with respect to said pole-forming portions that said stampings are angularly displaced with respect to one another in the same direction round the axis of said shaft over an angular span of displacement substantially equal to the angular span of each of said stator poles, whereby both salient poles of said rotor formed by the pole-forming portions of said stampings are skew with respect to the axis of said shaft; and
connections to said stator pole windings for deriving said output voltage in dependence on the difference between the two voltages set up in operation across the respective stator pole windings;
the extent of angular displacement of each of said stampings with respect to the other stampings being such that on rotation of said shaft the said output voltage is, in respect of amplitude and phase with reference to said alternating voltage, a substantially sinusoidal function of the angular position of said shaft.

References Cited in the file of this patent

UNITED STATES PATENTS

| | | |
|---|---|---|
| 1,964,548 | Weiler | June 26, 1934 |
| 2,488,734 | Mueller | Nov. 22, 1949 |
| 2,606,944 | MacCallum | Aug. 12, 1952 |
| 2,719,930 | Lehde | Oct. 4, 1955 |
| 2,774,057 | Jones | Dec. 11, 1956 |
| 2,892,111 | Young | June 23, 1959 |
| 2,949,576 | Bolton | Aug. 16, 1960 |